(12) United States Patent
Yang et al.

(10) Patent No.: US 9,108,528 B2
(45) Date of Patent: Aug. 18, 2015

(54) OPEN MODULAR ELECTRIC POWERTRAIN AND CONTROL ARCHITECTURE

(75) Inventors: Hong Yang, Rochester Hills, MI (US); Norman K. Bucknor, Troy, MI (US)

(73) Assignee: GM GLOBAL TECHNOOGY OPERATIONS LLC, Detroit, MI (US)

( * ) Notice: Subject to any disclaimer, the term of this patent is extended or adjusted under 35 U.S.C. 154(b) by 460 days.

(21) Appl. No.: 13/081,448

(22) Filed: Apr. 6, 2011

(65) Prior Publication Data

US 2012/0259490 A1    Oct. 11, 2012

(51) Int. Cl.

| | |
|---|---|
| B60L 9/00 | (2006.01) |
| B60L 11/18 | (2006.01) |
| B60W 20/00 | (2006.01) |
| B60K 6/365 | (2007.10) |
| B60K 6/445 | (2007.10) |
| B60W 10/06 | (2006.01) |
| B60W 10/08 | (2006.01) |
| B60W 10/115 | (2012.01) |
| H02J 1/14 | (2006.01) |
| B60L 11/00 | (2006.01) |
| B60L 15/20 | (2006.01) |
| B60K 6/28 | (2007.10) |
| B60L 7/10 | (2006.01) |

(52) U.S. Cl.
CPC ............... *B60L 11/1881* (2013.01); *B60K 6/28* (2013.01); *B60K 6/365* (2013.01); *B60K 6/445* (2013.01); *B60L 11/005* (2013.01); *B60L 11/1851* (2013.01); *B60L 15/2045* (2013.01); *B60W 10/06* (2013.01); *B60W 10/08* (2013.01); *B60W 10/115* (2013.01); *B60W 20/106* (2013.01); *H02J 1/14* (2013.01); *B60L 7/10* (2013.01); *B60Y 2400/114* (2013.01); *Y02T 10/6239* (2013.01); *Y02T 10/6278* (2013.01); *Y02T 10/6286* (2013.01); *Y02T 10/705* (2013.01); *Y02T 10/7022* (2013.01); *Y02T 10/7283* (2013.01); *Y02T 10/92* (2013.01); *Y02T 90/34* (2013.01)

(58) Field of Classification Search
CPC .... B60L 11/1851; B60L 15/2045; H02J 1/14; Y02T 10/6286; Y02T 10/6278; Y02T 10/705; Y02T 10/7055; B60K 6/28; B60W 20/106
USPC ........ 701/22; 180/65.1, 65.21, 65.22, 65.225, 180/65.23, 65.24, 65.25, 65.26, 65.275, 180/65.28, 65.285, 65.29
See application file for complete search history.

(56) References Cited

U.S. PATENT DOCUMENTS 6,364,042 B1    4/2002  Joachim
8,060,267 B2 *  11/2011 Tamai et al. .................... 701/22

(Continued)

FOREIGN PATENT DOCUMENTS

WO    WO 2008146577 A1 * 12/2008

*Primary Examiner* — John Q Nguyen
*Assistant Examiner* — Jordan S Fei (57) ABSTRACT

A system to control a powertrain includes an energy management layer monitoring a plurality of potential energy storage devices and determining a reference available power for each of the potential energy storage devices. The system further includes a power management layer monitoring the reference available power for the potential energy storage devices, a power demanded of the powertrain, and an electric power constraint for the potential energy storage devices, and determining a power split based upon the monitored reference available power for the potential energy storage devices, the power demanded of the powertrain, and the electric power constraint for the potential energy storage devices. The system further includes a torque control layer controlling torque generation based upon the determined power split.

20 Claims, 4 Drawing Sheets

(56) References Cited

U.S. PATENT DOCUMENTS

2009/0105896 A1* 4/2009 Tamai et al. .................. 701/22
2011/0083309 A1* 4/2011 Kshatriya .................... 29/401.1
2011/0100735 A1* 5/2011 Flett ........................ 180/65.22
2011/0246013 A1* 10/2011 Yee et al. ..................... 701/22
2011/0302078 A1* 12/2011 Failing ......................... 705/39
2012/0065827 A1* 3/2012 Kimura et al. ................ 701/22
2013/0300191 A1* 11/2013 Takaoka ...................... 307/9.1

* cited by examiner

OPEN MODULAR ELECTRIC POWERTRAIN AND CONTROL ARCHITECTURE

TECHNICAL FIELD

This disclosure is related to a powertrain utilizing electric energy for propulsion.

BACKGROUND

The statements in this section merely provide background information related to the present disclosure and may not constitute prior art.

A variety of energy sources can provide power to a torque generative device of the powertrain. Electrical power can be provided from an energy storage device and the electrical power can be used to provide motive or propelling torque to the powertrain through the torque generative device.

Powertrains can utilize more than a single source of power. For example, a hybrid drive powertrain can utilize electrical power through a motor or motors and petroleum energy though a gasoline or diesel internal combustion engine. Other sources of energy are known including fuel cells and biodiesel or E85 fuels. Electrical power can be recovered through operation of the vehicle, for example, through regenerative braking. Further, electrical power can be created and energy stored in the energy storage device through directly driving a motor with an engine or driving an alternator, for example, as a belt driven device. Further, the energy storage device can be charged through a plug-in connection to an infrastructure power grid.

SUMMARY

A system to control a powertrain includes an energy management layer monitoring a plurality of potential energy storage devices and determining a reference available power for each of the potential energy storage devices. The system further includes a power management layer monitoring the reference available power for the potential energy storage devices, a power demanded of the powertrain, and an electric power constraint for the potential energy storage devices, and determining a power split based upon the monitored reference available power for the potential energy storage devices, the power demanded of the powertrain, and the electric power constraint for the potential energy storage devices. The system further includes a torque control layer controlling torque generation based upon the determined power split.

BRIEF DESCRIPTION OF THE DRAWINGS

One or more embodiments will now be described, by way of example, with reference to the accompanying drawings, in which.

DETAILED DESCRIPTION

Figure 1:
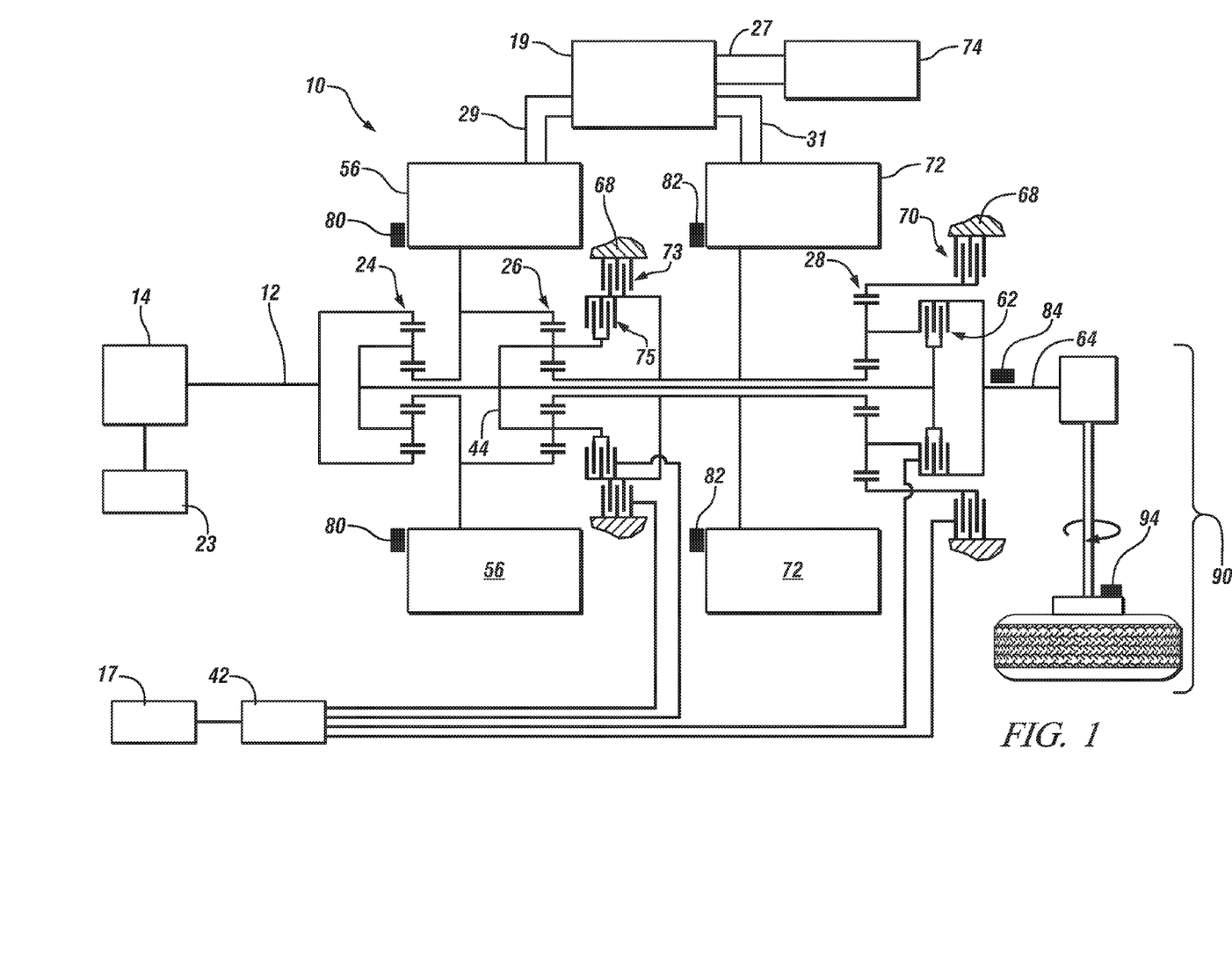
FIG. 1 illustrates an exemplary hybrid drive powertrain including an engine, transmission, driveline, control system, and hydraulic control circuit, in accordance with the present disclosure.

Referring now to the drawings, wherein the showings are for the purpose of illustrating certain exemplary embodiments only and not for the purpose of limiting the same, FIG. 1 illustrates an exemplary hybrid drive powertrain including an engine 14, transmission 10, driveline 90, control system, and hydraulic control circuit. Such an exemplary hybrid drive powertrain includes a plurality of torque generative devices operable in a powersplit mode wherein the various torque generative devices can selectively and cooperatively contribute torque to the powertrain. The transmission 10 includes an input shaft 12 having an input speed, $N_I$ that is preferably driven by the internal combustion engine 14, and an output shaft 64 having an output rotational speed, $N_O$. The rotational speed of the output shaft 64 is preferably monitored using a sensing system 84.

The exemplary engine 14 includes a multi-cylinder internal combustion engine selectively operative in several states to transmit torque to the transmission via shaft 12, and can be either a spark-ignition or a compression-ignition engine. The engine 14 has a crankshaft having characteristic speed $N_E$ which is operatively connected to the transmission input shaft 12. The output of the engine as quantified by speed $N_E$ and output torque $T_E$ can differ from transmission input speed $N_I$ and engine input torque $T_I$ when a torque management device is placed therebetween.

The transmission 10 utilizes three planetary gear sets 24, 26 and 28, and four torque-transmitting devices, i.e., clutches C1 70, C2 62, C3 73, and C4 75. An electro-hydraulic control system 42, preferably controlled by transmission control module (TCM) 17, is operative to control actuation and deactivation of the clutches. Clutches C2 and C4 preferably include hydraulically-actuated rotating friction clutches. Clutches C1 and C3 preferably include hydraulically-actuated stationary devices grounded to the transmission case 68. Each clutch is preferably hydraulically actuated, receiving pressurized hydraulic fluid from a pump via an electro-hydraulic control circuit.

A first electric machine 56, referred to as MG-A, and a second electric machine 72, referred to as MG-B, are operatively connected to the transmission via the planetary gears. Each of the machines includes a stator, a rotor, and a resolver assembly 80, 82. The stator for each machine is grounded to outer transmission case 68, and includes a stator core with coiled electrical windings extending therefrom. The rotor for MG-A 56 is supported on a hub plate gear that is operably attached to output shaft 60 via carrier 26. The rotor for MG-B 72 is attached to sleeve shaft hub 66. The resolver assemblies 80, 82 are appropriately positioned and assembled on MG-A 56 and MG-B 72. Each resolver assembly 80, 82 includes a known variable reluctance device including a resolver stator, operably connected to the stator of each electric machine, and a resolver rotor, operably connected to the rotor of each electric machine. Each resolver 80, 82 includes a sensing device adapted to sense rotational position of the resolver stator relative to the resolver rotor, and identify the rotational position. Signals output from the resolvers are interpreted to provide rotational speeds for MG-A 56 and MG-B 72, referred to as $N_A$ and $N_B$. Transmission output shaft 64 is operably connected to a vehicle driveline 90 to provide motive output torque, $T_O$ to vehicle wheels. The driveline 90 includes a transfer case 96 having a known axle ratio, which transmits torque to vehicle drive wheels. Each wheel of the vehicle, including the drive wheels and driven wheels, has a wheel speed sensing system 94 including one or more speed sensing devices mounted at the wheel and adapted to measure rotational speed of the respective wheel, including right-front (RF), right-rear (RR), left-front (LF), and left-rear (LR) wheels. The output of each wheel speed sensing system 94 is monitored by a brake control module.

The transmission 10 receives input torque from the torque-generative devices, including the engine 14, and MG-A 56 and MG-B 72, referred to as $T_I$, $T_A$, and $T_B$ respectively, as a result of energy conversion from fuel or electrical potential stored in an electrical energy storage device (ESD) 74. The ESD 74 is high voltage DC-coupled to transmission power inverter module (TPIM) 19 via DC transfer conductors 27. The TPIM 19 is an element of the control system. The TPIM 19 transmits electrical energy to and from MG-A 56 by transfer conductors 29, and the TPIM 19 similarly transmits electrical energy to and from MG-B 72 by transfer conductors 31. Electrical current is transmitted to and from the ESD 74 in accordance with whether the ESD 74 is being charged or discharged. TPIM 19 includes the pair of power inverters and respective motor control modules configured to receive motor control commands and control inverter states therefrom for providing motor drive or regeneration functionality. Preferably, MG-A 56 and MG-B 72 are three-phase AC machines each having a rotor operable to rotate within a stator that is mounted on a case of the transmission. The inverters include known complementary three-phase power electronics devices.

The exemplary hybrid drive powertrain of FIG. 1 can utilize various combinations of engine 14 and motors 56 and 72 to provide torque to the powertrain. The exemplary hybrid drive powertrain can be described as a two mode hybrid, wherein two electrically variable gears states (EVT1 and EVT2) are possible. EVT1 and EVT2 utilize operation of transmission 10 and associated the planetary gear sets 24, 26, and/or 28 along with selective operation of associated clutches and motors 56 and 72 to enable a variable ratio of $N_I$ to $N_O$. An embodiment of EVT1 includes using one of motors 56 and 72 to provide torque to the powertrain to drive output shaft 64, while the engine 14 can be utilized separately to drive the other motor as a generator and provide electrical energy to the energy storage device 74. Another embodiment of EVT1 includes using one of motors 56 and 72 to provide output torque to output shaft 64 while the engine is turned off and stationary. An embodiment of EVT2 includes utilizing all of engine 14 and motors 56 and 72 to simultaneously provide torque to output shaft 64. Another exemplary embodiment of EVT2 includes utilizing one or both of motors 56 and 72 to provide torque to output shaft 64 while turning off engine 14 and allowing the engine to spin freely. In some embodiments, engine 14 can be operated to open all associated exhaust and intake valves to reduce pumping losses associated with spinning the engine while it is turned off. Another exemplary embodiment of EVT2 includes utilizing motors 56 and 72 to simultaneously provide torque to output shaft 64 while actively maintaining the engine speed equal to or near zero.

Hybrid drive powertrains can take a number of embodiments, and a number of control schemes and resulting torque configurations can be achieved, and the disclosure is not intended to be limited to the exemplary embodiments provided herein.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

A powertrain configured to provide torque to an output shaft is controlled according to a requested output torque ($T_{O\_REQ}$), for example, as determined from an operator pedal position. The output of a powertrain can be described as power equaling the output torque times the speed of the output. Based upon $T_{O\_REQ}$, a power demanded of the powertrain or a power demand can be determined A hybrid drive powertrain can include a plurality of torque generative devices. A power split command can be determined commanding a portion of the required power demand from each of the plurality of torque generative devices. In one embodiment, a reference available power for some or all of the torque generative devices can be monitored, and the power split command can be determined based upon the reference available power for the torque generative devices and the power demand for the powertrain.

Some of the torque generative devices can have a plurality of energy sources. For example, an electric motor can be connected to and receive electrical power from a plurality of energy storage devices. In one embodiment, an electric motor can be connected to an electrical power supply bus, and power from a plurality of energy storage devices can be individually or cooperatively supplied to the electric motor. A system can monitor a reference available power each of the plurality of energy sources and determine a power split including how much power is to be provided from each of the energy storage devices.

An energy storage device, such as a battery device, has an amount of electrical energy that it can deliver. For example, an energy storage device with a high state of charge (SOC) can deliver a substantial amount of electrical energy to a powertrain, whereas an energy storage device with a low SOC can deliver only a limited amount of electrical energy to the powertrain. A reference available power for an energy storage device can be determined based upon the amount of electrical energy it can deliver. Further, an energy storage device has constraints upon an amount of electrical power or electrical energy per unit time that it can deliver to the powertrain. For example, a peak electrical power of an energy storage device can result from the physical limitations of the device. The limit of electrical power that an energy storage device can deliver can be described as electrical power constraints. By monitoring reference available power signals from each torque generative device and/or from each energy storage device capable of delivering power to a torque generative device, the power split command can be determined to manage torque generation to meet the power demand of the powertrain.

Figure 2:
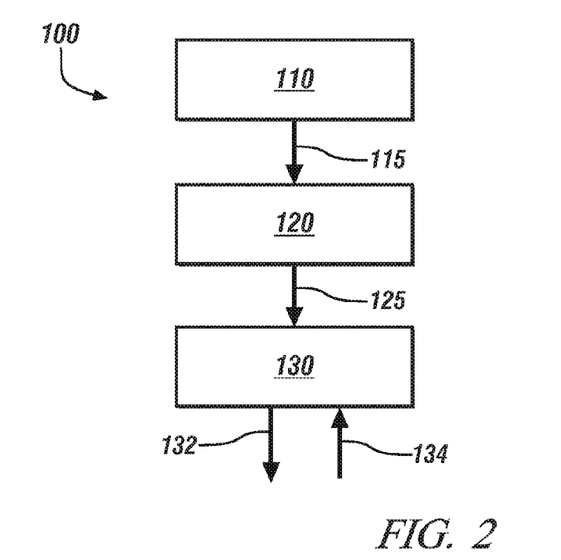
FIG. 2 illustrates an exemplary system to control a powertrain including an energy management layer monitoring potential energy sources, a power management layer determining a power split command based upon reference available power, power constraints, and power demand, and a torque management layer transforming the power split command into commands to a torque generative device, in accordance with the present disclosure.

FIG. 2 illustrates an exemplary embodiment of a powertrain controller utilized to control a powertrain including an energy management layer monitoring potential energy sources, a power management layer determining a power split command based upon reference available power, power constraints, and power demand, and a torque management layer transforming the power split command into commands to a torque generative device. Configuration 100 includes energy management layer 110, power management layer 120, and torque management layer 130. Energy management layer 110 monitors available sources of energy to provide power to the powertrain and outputs a reference available power 115 for each of the available sources of energy to power management layer 120. Power management layer 120 monitors the reference available power 115, a request for power output, and constraints upon power generation for each of the available sources of energy and outputs a power split command 125 to torque management layer 130. According to one embodiment, the power management layer includes a powertrain control module that outputs the power split command 125. Torque management layer 130 monitors the power split command and accordingly determines commands 132 to a torque generative device. Torque management layer can additionally receive feedback 134 from the torque generative device.

Configuration 100 utilizes reference available power 115 to determine a power split command 125 for controlling the powertrain. According to one embodiment, configuration 100 can be utilized as an open modular electric powertrain control, permitting the sources of power and the torque generative devices of the powertrain to change with the configuration adapting based upon reference power available values for the available devices and based upon available torque generative devices.

Figure 3:
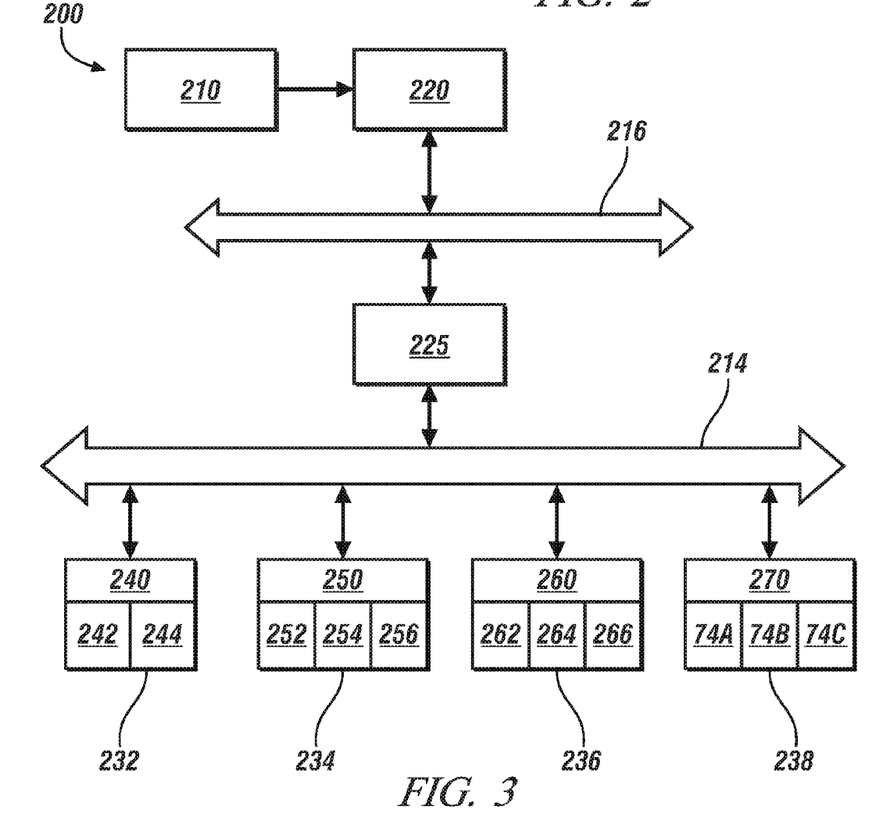
FIG. 3 illustrates an exemplary embodiment of the system of FIG. 2, in accordance with the present disclosure.

FIG. 3 illustrates an exemplary embodiment of the system of FIG. 2 utilized to control a powertrain in greater detail, including a physical communication layer communicating with a modular electric powertrain. Configuration 200 includes a driver interface device 210, a vehicle controller 220, a vehicle communication area network (CAN) 216, a centralized powertrain control module 225, a physical communication layer 227, and modules 232, 234, 236, and 238. Powertrain control module 225 is in communication with a friction module 232, a mechanical module 234, a motor generator module 236, and energy storage module 238 through physical communication layer 227. Each of modules 232, 234, 236, and 238 monitors a different type of energy source or power that can used to meet the power demand and can include modular energy sources that can be selectively added or removed from the powertrain. One having ordinary skill in the art appreciates that other types of energy sources could be similarly managed and used to meet all or a portion of a power demand. Physical communication layer 227 can be a high speed control area network (CAN) or similar device facilitating high speed communication. Friction module 232 manages a kinetic or frictional power. Friction module 232 includes friction controller 240, a front friction unit 242, and a rear friction unit 244. Friction units 242 and 244 include devices that can translate kinetic energy into power, for example, including regenerative braking units using motion of wheels to generate electrical power. Friction controller 240 provides a reference available power for friction units 242 and 244 to the centralized powertrain control module 225 through physical communication layer 227 and also implements commands to friction units 242 and 244 based upon the power split command from powertrain control module 225. Mechanical module 234 manages a mechanical power. Mechanical module 234 includes mechanical controller 250, a front mechanical power unit 252, a rear mechanical power unit 254, and a neutral or auxiliary power unit (APU) mechanical power unit 256. Mechanical power units 252, 254, and 256 include devices that generate mechanical or electrical power based upon a mechanical process, such as through combustion within an engine. Mechanical controller 250 provides a reference available power for mechanical units 252, 254, and 256 to the centralized powertrain control module 225 through physical communication layer 227 and also implements commands to mechanical units 252, 254, and 256 based upon the power split command from the powertrain control module 225. Motor generator module 236 manages electrical power within motor/generator units. Motor generator module 236 includes motor generator controller 260, a front motor generator unit 262, a rear motor generator unit 264, and a dedicated generator unit 266. Motor generator units 262 and 264 include devices that can translate electrical power into torque and/or torque into electrical power. Motor generator unit 266 is a dedicated generator unit, for example, connected to an engine and providing electric power on demand. Motor generator controller 260 provides a reference available power for motor generator units 262, 264, and 266 to the centralized powertrain control module 225 through physical communication layer 227 and also implements commands to motor generator units 262, 264, and 266 based upon the power split command from the powertrain control module 225. Energy storage module 238 manages stored electrical power. Energy storage module 238 includes energy storage device controller 270, a first energy storage device 74A, a second energy storage device 74B, and a third energy storage device 74C. Energy storage devices can include any device that can store and eventually discharge electrical energy. Energy storage device controller 270 provides a reference available power for energy storage devices 74A, 74B, and 74C to the centralized powertrain control module 225 through physical communication layer 227 and also implements commands to energy storage devices 74A, 74B, and 74C or devices controlling charging and discharging of the energy storage devices based upon the power split command from the powertrain control module 225. Each of modules 232, 234, 236, and 238 are illustrated with potential devices that can be used with configuration 200 but are not necessarily present. For example mechanical module 234 includes mechanical power units 252, 254, and 256. Configuration 200 is capable of operating with any or all of mechanical units 252, 254, and 256, but these units may be modularly added or removed as desired. By equipping each of modules 232, 234, 236, and 238 with controllers, power generation in each of the modules can be individually regulated while the modular operation of the modules is enabled by the communication of each the controllers with the centralized powertrain control module 225.

Configuration 200 operates as an open modular electric powertrain controller. Modules 232, 234, 236, and 238 act as an energy management layer, providing a reference available power to the powertrain control module 225. The powertrain control module 225 acts as a power management layer, monitoring the reference available power for each of the modules and determining a power split command. Modules 232, 234, 236, and 238 act as a torque management layer, receiving the power split command and delivering necessary power to a torque generative device or devices based upon the power split command.

Figure 6:
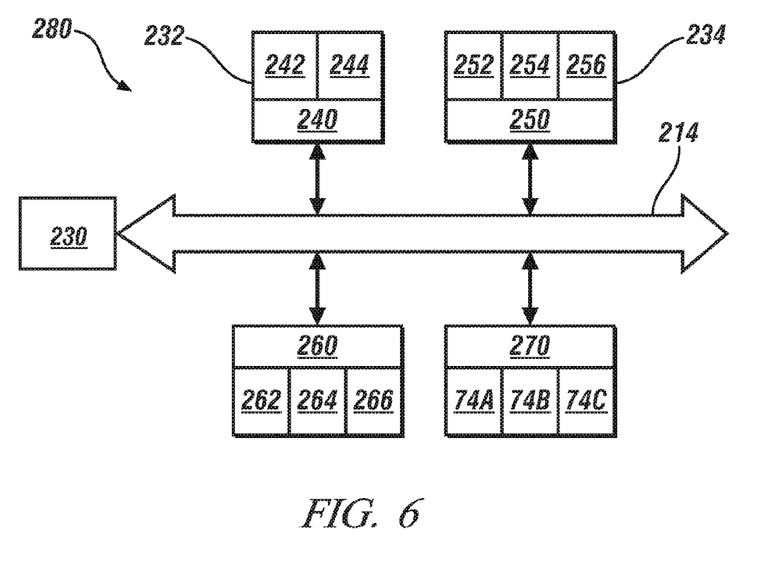
FIG. 6 illustrates a commonized power based control structure enabling modular operation of the powertrain, in accordance with the present disclosure.

FIG. 6 illustrates a commonized power based control structure enabling modular operation of the powertrain. Friction module 232 includes friction controller 240, front friction unit 242, and rear friction unit 244. Mechanical module 234 includes mechanical controller 250, front mechanical power unit 252, rear mechanical power unit 254, and APU mechanical power unit 256. Motor generator module 236 includes motor generator controller 260, front motor generator unit 262, rear motor generator unit 264, and dedicated generator unit 266. Energy storage module 238 includes energy storage device controller 270, first energy storage device 74A, second energy storage device 74B, and third energy storage device 74C. Energy and power management controller 230 communications with modules 232, 234, 236, and 238 through power bus 214.

Power bus 214 is a common protocol defining the signal flow between the centralized powertrain controller 225, powertrain control modules 240, 250, 260 and energy storage controller 270 based on the physical communication layer. Power bus 214 enables power based control architecture for the modular electric powertrain, and standardizing the communication between powertrain controller and energy storage controller at energy management layer 110 and power management layer 120. The power bus common protocol can communicated over a physical communication layer between the powertrain controller and controllers of the various energy sources including a plurality of energy storage devices.

Reference available energy and power signals and power split commands can be communicated via power bus 214. By commonizing communication through power bus 214 as energy and power available and power commands to be provided to the powertrain, devices and entire modules can be modularly operated through the standardized control enabled by the commonizing. In one embodiment, the energy and power management controller 230 embodies the energy management layer 110, and the controller 230 along with controllers 240, 250, 260, and 270 embodies the power management layer 120.

Figure 4:
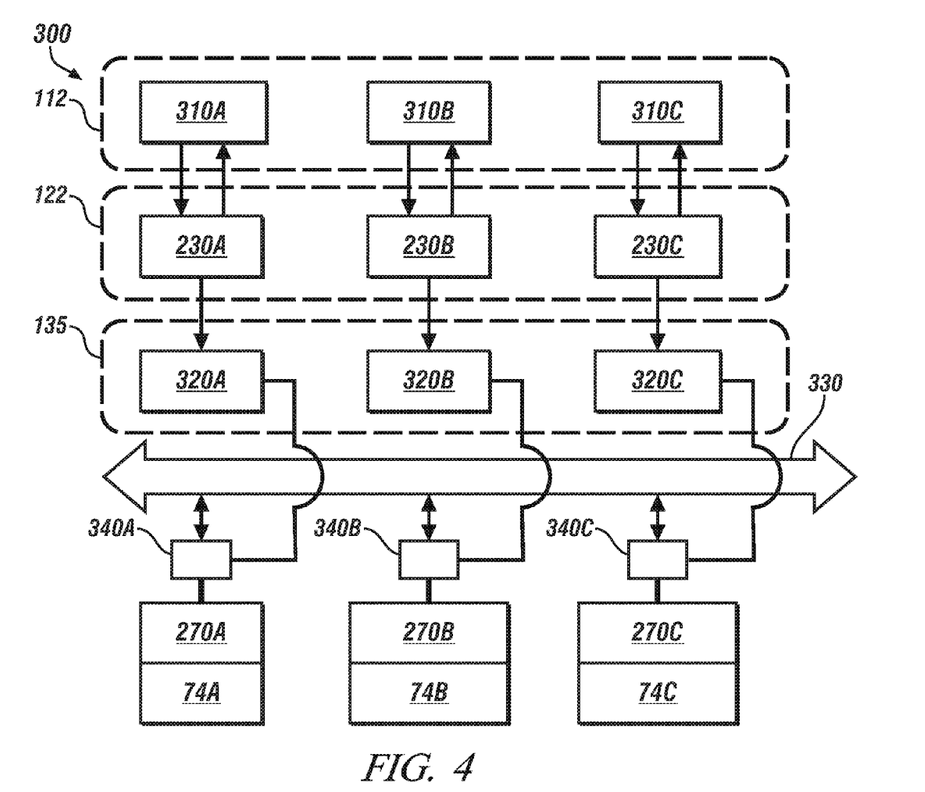
FIG. 4 illustrates another exemplary embodiment of the system of FIG. 2, in accordance with the present disclosure.

One non-limiting embodiment that energy storage module 238 managing a plurality of energy storages can take includes an open energy storage module. FIG. 4 illustrates an exemplary embodiment of an open energy storage module. Configuration 300 includes an energy management layer 112 including a plurality of energy management controllers 310A, 310B, and 310C; a power management layer 122 including a plurality of power management controllers 315A, 315B, and 315C; and an electronic control layer 135 including a plurality of voltage/current regulators 320A, 320B, and 320C. Energy management layer 112 and power management layer 122 operate similarly to energy management layer 110 and power management layer 120, with layers 112 and 122 acting locally within the open energy storage module. According to one embodiment, controllers 310A, 310B, and 310C and controllers 315A, 315B, and 315C share power bus communication structure with the centralized powertrain control module, and voltage current regulators 320A, 320B, and 320C are located locally at the individual energy storage devices. In an embodiment utilizing an open energy storage module, the energy management layer and power management layer can be shared between the open energy storage module and the powertrain control module. The electronic control layer 135 collectively controls electrical power delivered to a high-voltage DC bus 330 delivering power to a torque generative device or devices. Voltage/current regulators 320A, 320B, and 320C output power split commands to DC/DC converter modules 340A, 340B, and 340C, the commands embodied as contribution commands, commanding a portion of required power to come from each of energy storage devices 74A, 74B, and 74C. DC/DC converter modules 340A, 340B, and 340C utilize the contribution commands from voltage/current regulators 320A, 320B, and 320C, respectively, to condition electrical power flowing to and from energy storage devices 74A, 74B, and 74C, respectively. Each energy storage device is additionally controlled by a module controller unit 270A, 270B, and 270C, respectively, including current balancing and performing diagnostics and/or prognostics.

An open energy storage module as embodied in configuration 300 can be utilized as an energy storage module 238 in configuration 200. According to one embodiment, an open energy storage module can manage a plurality of energy storage devices collectively as a functional single energy source, and another module and controller managing an alternate energy source, for example, mechanical power as available through an engine, can operate together. Through a physical communication layer, the open energy storage module, the controller managing the alternate energy source, and the power management layer can communicate as disclosed herein.

The energy management layer 110 monitors or evaluates energy storage devices 74 and outputs a reference available power for each of the energy storage devices that can potentially be used to provide power to the powertrain or potential energy storage devices. These potential energy storage devices can be a fixed device, remaining unchanged for a powertrain through the lifespan of the powertrain. In another embodiment, the system can adaptively monitor available potential energy storage devices, torque generative devices, and other resources available to the system and adaptively determine the power split command based upon the monitored elements. A powertrain may be configured to optionally accept a variety of potential energy storage devices. An exemplary powertrain can be originally equipped with a single battery but include electrical attachments for an extra device that can be purchased separately to extend the range of the powertrain. For example, batteries of different chemical composition or a mix of batteries and an ultra-capacitor can be added and used. Additionally, alternative devices utilizing different or alternative energy sources such as gas, diesel, E85, CNG, or LPG can be added and used, for example, within a micro-turbine device or fuel cell device, generating electricity for use by the powertrain. Alternatively, the original battery can be removed and replaced with a new energy storage device. This ability to add, remove, or replace energy storage devices can be termed modular operation of the potential energy storage devices. Modular operation permits installation of, for example, a first modular energy storage device of alternative energy source and/or a second modular energy storage device of alternative energy source.

Modular operation can be enabled by defining a common protocol that potential energy storage devices must conform to in order to be used with the powertrain. Such a common protocol can dictate how a conforming device interacts with the energy management layer, power management layer, or electronic control layer. In this way, energy storage devices from a wide variety of manufacturers can be selected by an operator based upon the required use of the powertrain or availability. In one embodiment, an operator can utilize operator interchangeable modular energy storage devices, with one unit being plugged in and charging while the other is being used in the vehicle. In another embodiment, modular energy storage devices can be exchanged at a recharging station, for example, with the recharging station removing a depleted energy storage device from a vehicle, replacing it with a compatible, fully charged energy storage device, and recharging the removed, depleted energy storage device for use in another vehicle.

Use of multiple energy storage devices with the powertrain can include two or more energy storage devices being used in parallel and concurrently available to the powertrain, with the different energy sources being used cooperatively or selectively based upon measured or estimated SOC and/or preferred operating ranges of the different energy sources. For example, an energy storage device with a first chemical composition and an energy storage device with a second chemical composition can be utilized in parallel, and each energy storage device can be utilized optimally based upon the properties of each in different operating ranges. In another example, an ultra-capacitor device capable of storing a charge can be used in combination with a battery device, and each of the devices can be used optimally based upon the properties of each in different operating ranges. In the alternative, one energy storage device can be identified as a primary energy storage device, and a second energy storage device can be identified as a modular auxiliary energy storage device, for example, added by the operator and used when the SOC of the primary energy storage device reaches a minimum threshold level. In another embodiment, a plurality of energy storage devices can be used together in an energy storage system, with the plurality of energy storage devices cooperating as a single system to provide a single energy source to the powertrain. The energy storage system can be monitored by the energy management layer as a single system, or the individual energy storage devices can be monitored individually.

Figure 7:
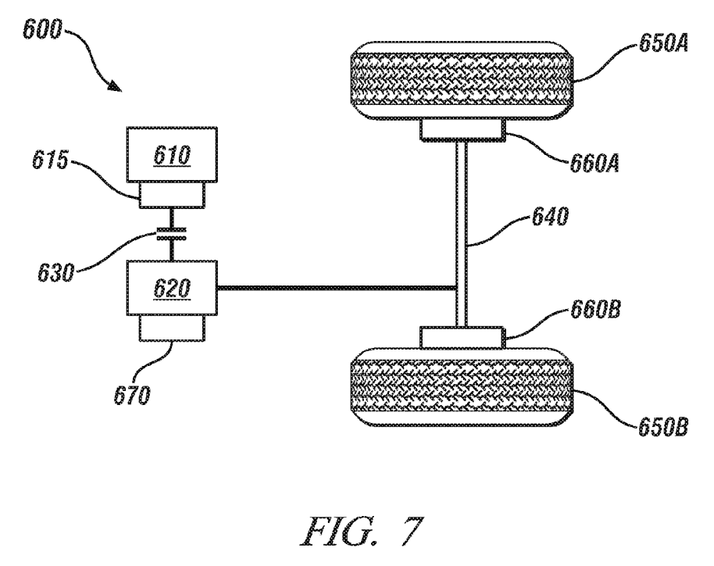
FIG. 7 illustrates an exemplary powertrain utilizing modular operation of torque generative devices, in accordance with the present disclosure.

Additionally, the modular electric powertrain control architecture disclosed herein permits modular operation of torque generative devices and other resources to the powertrain. For example, a vehicle can originally be equipped as an electric drive powertrain with a motor, an energy storage device, and a plug-in connection. If the powertrain is in a vehicle operated in an area, such as a mountainous region, wherein increased output torque is required of the powertrain, an additional motor and energy storage device can be added to the vehicle, and the system disclosed would monitor the additional energy storage device and issue a power split command between the two motors. In another example, wherein an extended range is consistently required, an engine operating as an APU can be added to the exemplary electric drive powertrain. A number of modular devices can be utilized with the disclosed system, and the disclosure is not intended to be limited to the particular exemplary embodiments provided herein. FIG. 7 illustrates an exemplary powertrain utilizing modular operation of torque generative devices. Powertrain 600 includes engine 610, transmission 620, clutch 630, driveline 640, wheels 650A and 650B with at-wheel motors 660A and 660B, respectively, motor generator 670, and integrated starter generator 615. Powertrain 600 can originally include any of a number of combinations of torque generative devices 610, 615, 660A, 660B, and 670. Based upon the desired operation of the powertrain including output torque, range, and other considerations, any of the torque generative devices can be added or removed as needed based upon the described utilization of a modular electric powertrain control architecture.

Figure 5:
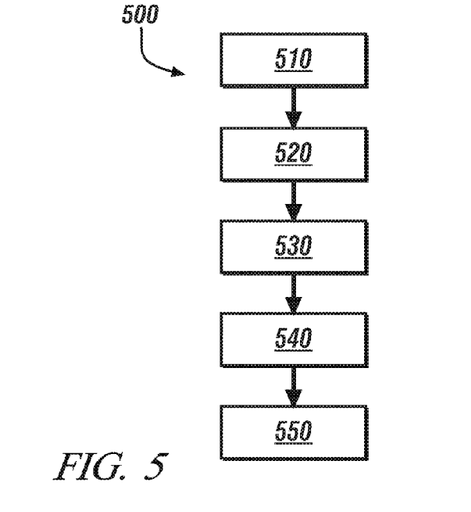
FIG. 5 illustrates an exemplary process to operate a powertrain with a plurality of potential energy storage devices, in accordance with the present disclosure.

FIG. 5 illustrates an exemplary process to operate a powertrain with a plurality of potential energy storage devices. Table 1 is provided as a key to the process illustrated in FIG. 5.

TABLE 1

| Block | Description |
|---|---|
| 510 | Monitor a Power Demand for the Powertrain |
| 520 | Monitor a Reference Available Power for Each of the Potential Energy Storage Devices |
| 530 | Monitor a Power Constraint for Each of the Potential Energy Storage Devices |
| 540 | Determine a Power Split Command Based upon the Power Demand, the Reference Available Power for Each of the Potential Energy Storage Devices, and the Power Constraint for Each of the Potential Energy Storage Devices |
| 550 | Utilize the Power Split Command to Control the Powertrain |

Process 500 begins at block 510 wherein the system monitors a power demand for the powertrain that must be met. In block 520, the system monitors a reference available power for each potential energy storage device available to the powertrain. In block 530, the system monitors a power constraint for the potential energy storage devices available to the powertrain. In block 540, the system determines a power split command based upon the power demand, the reference available power for each of the potential energy storage devices, and the power constraint for each of the potential energy storage devices. In block 550, the power split command is utilized to control the powertrain.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. System to control a powertrain, the system comprising:
an energy management layer comprising a friction module, a mechanical module, a motor generator module, and an open energy storage module, each module comprising a respective controller and an adaptable plurality of available modular energy sources that can be selectively added or removed from the powertrain:
adaptively monitoring, at the open energy storage module controller, an adaptable plurality of available modular energy sources, including a plurality of modularly operated available potential energy storage devices, wherein the plurality of modularly operated available potential energy storage devices adaptively include one or more extra potential energy storage devices added during the lifespan of the powertrain as needed in addition to potential energy storage devices originally equipped by the powertrain, and wherein the open energy storage module controller is configured to adaptively monitor additional potential energy storage devices replacing any of the potential energy storage devices originally equipped by the powertrain during the lifespan of the powertrain;
adaptively monitoring, at the friction module controller, the mechanical module controller and the motor generator module controller, the respective adaptable plurality of available modular energy sources, each module controller monitoring alternative types of available modular energy sources;

adaptively determining, at each of the open energy storage module controller, the friction module controller, the mechanical module controller and the motor generator module controller a respective reference available power for each of the available modular energy sources; and adaptively outputting, at each of the open energy storage module controller, the friction module controller, the mechanical module controller and the motor generator module controller, the respective reference available power for each of the available modular energy sources to a centralized powertrain controller via a power bus;

a power management layer comprising the centralized powertrain controller:

adaptively monitoring, at the centralized powertrain controller, the reference available power for each of the available modular energy sources output from each of the open energy storage module controller, the friction module controller, the mechanical module controller and the motor generator module controller, a power demanded of the powertrain, and an electric power constraint for the available modular energy sources;

adaptively monitoring, at the central powertrain controller, at least one modularly operated torque generative device of the powertrain capable of generating torque to meet the power demanded of the powertrain, wherein the at least one modularly operated torque generative device adaptively includes one or more extra torque generative devices added during the lifespan of the powertrain in addition to at least one torque generative device originally equipped by the powertrain;

adaptively determining, at the centralized powertrain controller, a power split command based upon the adaptively monitored reference available power for each of the available modular energy sources, the power demanded of the powertrain, the electric power constraint for the available modular energy sources, and the at least one modularly operated torque generative device; and outputting, at the centralized powertrain controller, the power split command to the friction module controller, the mechanical module controller, the motor generator module controller, and the open energy storage module controller, wherein the power split command is operative to condition either one of electrical power flowing to or from each available modular energy sources; and a torque control layer comprising the friction module, the mechanical module, the motor generator module, and the open energy storage module, the torque control layer adaptively controlling torque generation of the at least one modularly operated torque generative device based upon the determined power split command received by the friction module controller, the mechanical module controller, the motor generator module controller, and the open energy storage module controller.

2. The system of claim 1, wherein the plurality of modularly operated available potential energy storage devices comprises a first alternative energy storage device and a second alternative energy storage device.

3. The system of claim 2, wherein the first alternative energy storage device and the second alternative energy storage device are operator interchangeable and interact with the energy management layer according to a common protocol.

4. The system of claim 1, wherein the plurality of modularly operated available potential energy storage devices comprises a primary energy storage device and a modular auxiliary energy storage device.

5. The system of claim 1, wherein the plurality of modularly operated available potential energy storage devices comprises a first battery device with a first chemical composition and a second battery device with a second chemical composition.

6. The system of claim 1, wherein the plurality of modularly operated available potential energy storage devices comprises an ultra-capacitor device.

7. The system of claim 1, wherein the plurality of available modular energy sources of each module are concurrently available to the powertrain.

8. The system of claim 7, wherein the system further comprises a physical communication layer communicating between each of the friction module controller, the mechanical module controller, the motor generator module controller and the open energy storage module controller in the energy management layer, and the power management layer.

9. The system of claim 7, wherein the energy management layer further comprises:

the open energy storage module controller managing an energy storage device;

the motor generator module controller managing a motor generator device;

the mechanical module controller managing an internal combustion engine; and the friction module controller managing a friction power device; and further comprising a physical communication layer communicating between the open energy storage module controller, the motor generator controller, the mechanical controller, the friction controller, and the power management layer.

10. The system of claim 7, wherein the plurality of available modular energy sources of each module concurrently available to the powertrain are electrically connected to a high-voltage DC bus.

11. The system of claim 7, wherein the open energy storage module comprises:

an electronic control layer controlling a DC/DC converter regulating voltage and current for each of the plurality of modularly operated available potential energy storage devices concurrently available to the powertrain; and a module controller unit balancing current and performing diagnostics and prognostics for each of the plurality of available modular energy sources of the open energy storage module concurrently available to the powertrain.

12. The system of claim 1, wherein the system further comprises a physical communication layer wherein a signal flow is communicated between the centralized powertrain controller and the plurality of available modular energy sources of each module utilizing a power bus common protocol.

13. System to control a powertrain comprising:

an open energy storage module controller adaptively managing a plurality of available modular energy sources that can be selectively added or removed from the powertrain, including a plurality of modularly operated available potential energy storage devices, wherein the plurality of modularly operated available potential energy storage devices adaptively include one or more extra potential energy storage devices added during the lifespan of the powertrain as needed in addition to potential energy storage devices originally equipped by the powertrain, and wherein the open energy storage module controller is configured to adaptively monitor additional potential energy storage devices replacing any of the potential energy storage devices originally equipped by the powertrain during the lifespan of the powertrain;

a motor generator module including a motor generator controller managing a motor generator device and a plurality of available modular generator energy sources that can be selectively added or removed from the powertrain;

a mechanical module including a mechanical module controller managing an internal combustion engine and a plurality of available modular mechanical energy sources that can be selectively added or removed from the powertrain; and a friction module including a friction module controller managing a friction power device and a plurality of available modular frictional energy sources that can be selectively added or removed from the powertrain;

an energy management layer:

adaptively monitoring, at the open energy storage module controller, the motor generator module controller, the mechanical module controller, and the friction module controller, the respective adaptable plurality of available modular energy sources, each module controller monitoring alternative types of available modular energy sources; and adaptively determining a reference available power for each of the available modular energy sources of each of the open energy storage module, the motor generator module, the mechanical module, and the friction module and adaptively outputting the reference available powers to a centralized powertrain controller;

a power management layer comprising the centralized powertrain controller:

adaptively monitoring the reference available power for each of the available modular energy sources of the open energy storage module, the motor generator module, the mechanical module, and the friction module, a power demanded of the powertrain, and an electric power constraint for each of the open energy storage module, the motor generator module, the mechanical module, and the friction module;

adaptively monitoring at least one modularly operated torque generative device of the powertrain capable of generating torque to meet the power demanded of the powertrain, wherein the at least one modularly operated torque generative device adaptively includes one or more extra torque generative devices added during the lifespan of the powertrain in addition to at least one torque generative device originally equipped by the powertrain;

adaptively determining a power split command based upon the adaptively monitored reference available power for each of the available modular energy sources of the open energy storage module, the motor generator module, the mechanical module, and the friction module, the power demanded of the powertrain, and the electric power constraint for each of the open energy storage module, the motor generator module, the mechanical module, and the friction module; and a torque control layer adaptively controlling torque generation of the at least one modularly operated torque generative device based upon the power split command.

14. The system of claim 13, wherein the plurality of modularly operated available potential energy storage devices comprise a battery of a first chemical composition and a battery of a second chemical composition.

15. The system of claim 13, wherein the plurality of modularly operated available potential energy storage devices comprise a battery and an ultra-capacitor device.

16. The system of claim 13, wherein the motor generator device comprises an at-Wheel motor.

17. The system of claim 13, wherein the internal combustion engine comprises an auxiliary power unit.

18. Method to control a powertrain, comprising:

connecting an energy storage device controller of an open energy storage module adaptively managing an adaptable plurality of available modular energy sources that can be selectively added or removed from the powertrain, the available modular energy sources including a plurality of modularly operated available potential energy storage devices, a motor generator controller of a motor generator module adaptively managing an adaptable plurality of available modular energy sources that can be selectively added or removed from the powertrain, a mechanical controller of a mechanical module adaptively managing an adaptable plurality of available modular energy sources that can be selectively added or removed from the powertrain, a friction controller of a friction module adaptively managing an adaptable plurality of available modular energy sources that can be selectively added or removed from the powertrain, and an energy and power management centralized controller through a physical communication layer, wherein the adaptable plurality of available modular energy sources that can be selectively added or removed from the powertrain adaptively include one or more extra potential energy storage devices added during the lifespan of the powertrain as needed in addition to available modular energy sources originally equipped by the powertrain, and wherein the open energy storage module,the friction module, the mechanical module and the motor generator module are configured to adaptively monitor additional available modular energy sources replacing any of the available modular energy sources originally equipped by the powertrain during the lifespan of the powertrain;

within each of the energy storage device controller, the motor generator controller, the mechanical controller, and the friction controller, adaptively generating a reference power available signal to the energy and power management centralized controller of the physical communication layer;

within the energy and power management centralized controller, adaptively determining a power split command based upon the adaptively generated reference power available signals from each of the energy storage device controller, the motor generator controller, the mechanical controller, and the friction controller and a power demanded of the powertrain; and utilizing the power split command from the energy and power management centralized controller to command torque generation of at least one torque generative device within the powertrain.

19. System to control a powertrain, the system comprising:

an energy management layer comprising:

a mechanical module comprising a mechanical module controller and an adaptable plurality of available modular energy sources that can be selectively added or removed from the powertrain;

a motor generator module comprising a motor generator module controller and an adaptable plurality of available modular energy sources that can be selectively added or removed from the powertrain;

a friction module comprising a friction module controller and an adaptable plurality of available modular energy sources that can be selectively added or removed from the powertrain; each of the friction module controller, the mechanical module controller and the motor generator module controller, configure to adaptively monitor the respective adaptable plurality of available modular energy sources, each module controller monitoring alternative types of available modular energy sources;

an open energy storage module comprising a open energy storage module controller and an adaptable plurality of available modular energy sources that can be selectively added or removed from the powertrain, the open energy storage module controller adaptively monitoring the adaptable plurality of available modular energy sources, including a plurality of modularly operated available potential energy storage devices, wherein the plurality of modularly operated available potential energy storage devices adaptively include one or more extra potential energy storage devices added during the lifespan of the powertrain as needed in addition to potential energy storage devices originally equipped by the powertrain, and wherein the open energy storage module controller is configured to adaptively monitor additional potential energy storage devices replacing any of the potential energy storage devices originally equipped by the powertrain during the lifespan of the powertrain; and an energy and power management controller:
communicating with the energy management layer through a power bus common protocol;
adaptively receiving a reference available power for each of the available modular energy sources from each of the friction module, the mechanical module, the motor generator module, and the open energy storage module; and
adaptively outputting a power split command to the friction module, the mechanical module, the motor generator module, and the open energy storage module for controlling operation of the powertrain.

20. The system of claim 19, wherein each of the mechanical module, the motor generator module, the friction module, and the open energy storage module comprises a separate controller.

* * * * *